Figure 1:
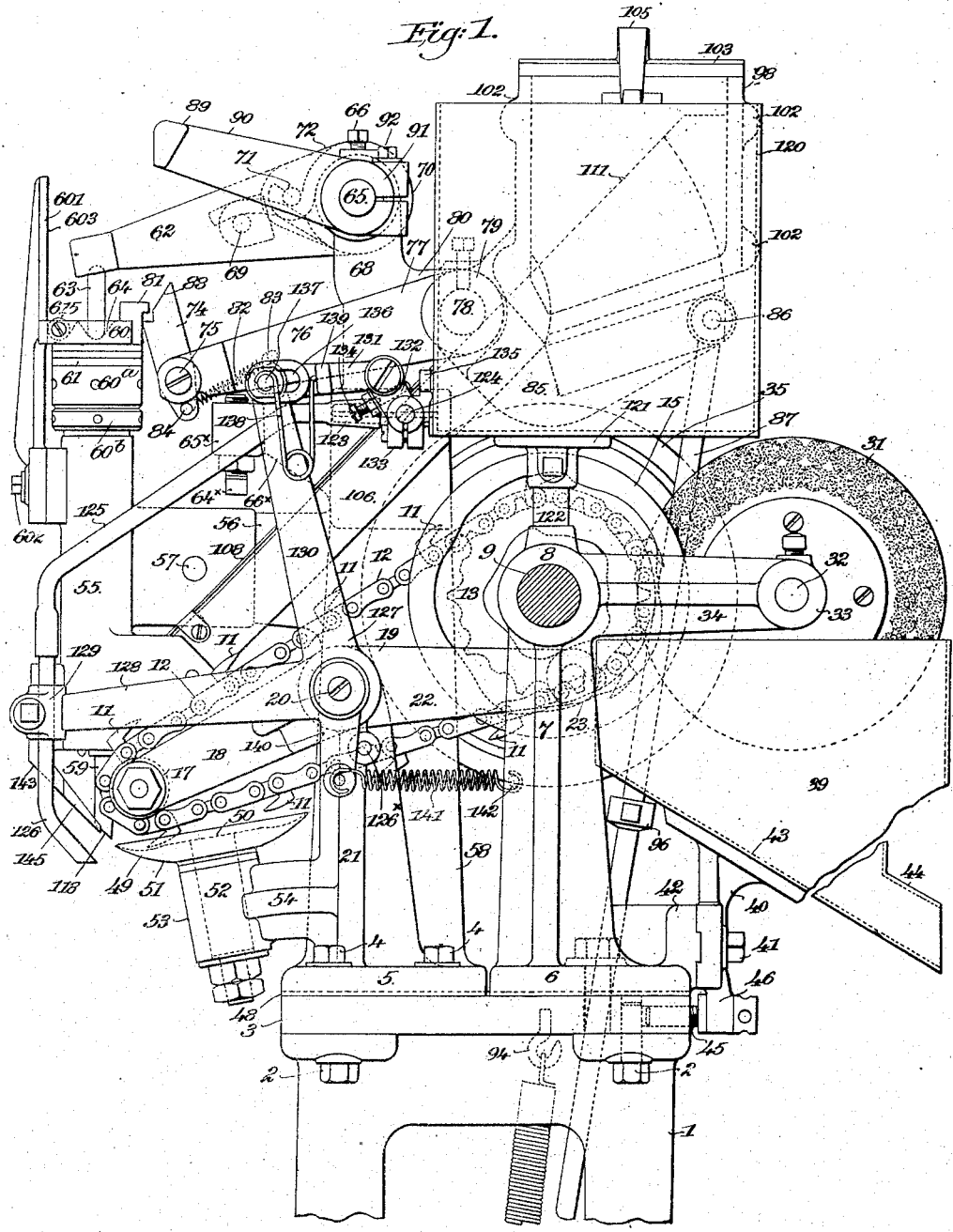

No. 864,532. PATENTED AUG. 27, 1907.
J. B. HADAWAY.
MACHINE FOR PREPARING SHOES FOR SEWING.
APPLICATION FILED NOV. 6, 1899.

5 SHEETS—SHEET 1.

Witnesses:
John F. C. Brinckloh
A. E. White

Inventor:
John B. Hadaway
By his attorneys
Phillip & Anderson

No. 864,532. PATENTED AUG. 27, 1907.
J. B. HADAWAY.
MACHINE FOR PREPARING SHOES FOR SEWING.
APPLICATION FILED NOV. 6, 1899.

5 SHEETS—SHEET 3.

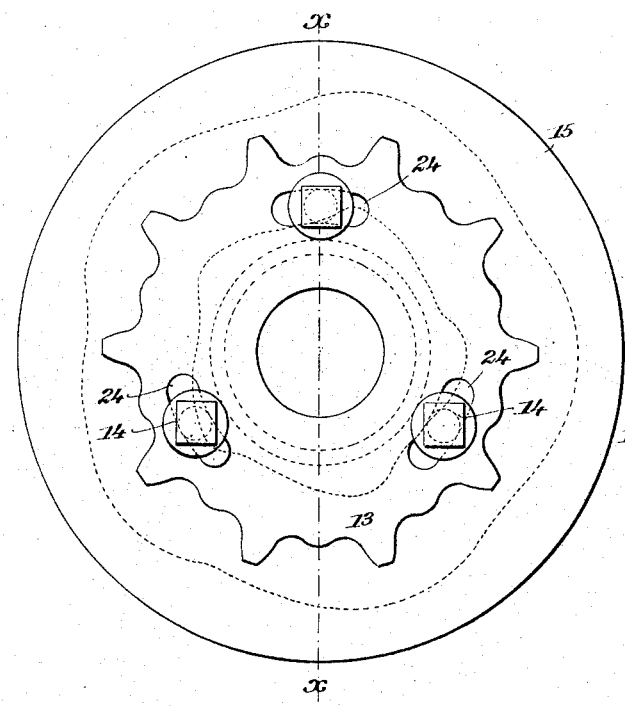
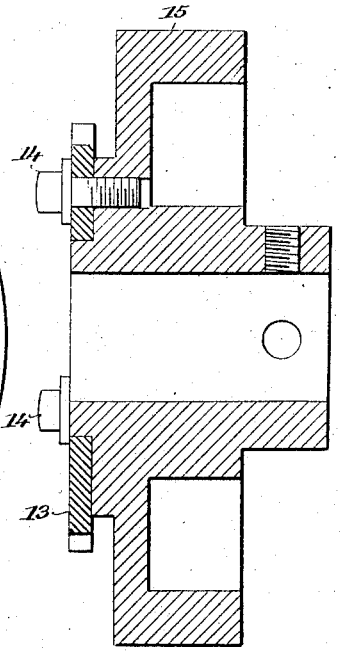
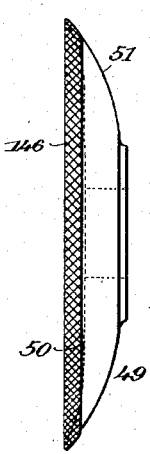
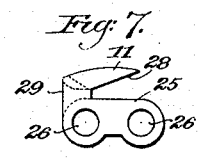
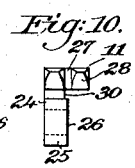
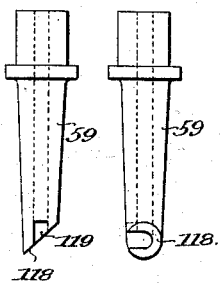

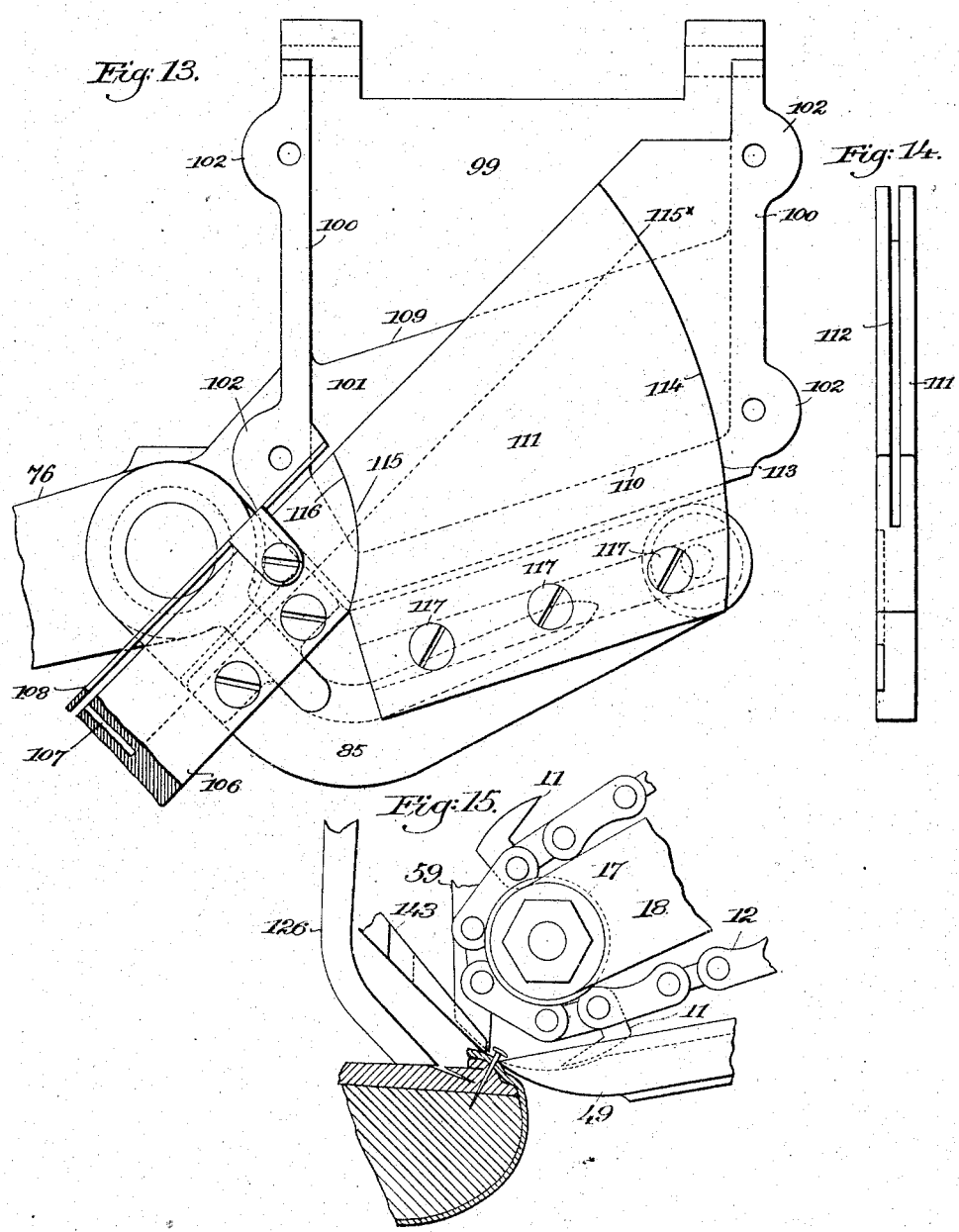

UNITED STATES PATENT OFFICE.

JOHN B. HADAWAY, OF BROCKTON, MASSACHUSETTS.

MACHINE FOR PREPARING SHOES FOR SEWING.

No. 864,532.  Specification of Letters Patent.  Patented Aug. 27, 1907.

Application filed November 6, 1899. Serial No. 735,939.

*To all whom it may concern:*

Be it known that I, JOHN B. HADAWAY, a citizen of the United States, residing at Brockton, in the county of Plymouth and State of Massachusetts, have invented certain new and useful Improvements in Machines for Preparing Shoes for Sewing; and I do hereby declare the following to be a full, clear, and exact description of the invention, such as will enable others skilled in the art to which it appertains to make and use the same.

The present invention relates to machines for manufacturing boots and shoes and more particularly to a machine for preparing lasted boots or shoes for sewing the upper and sole of a turned shoe, or the upper, insole and welt of a welted shoe, by the usual sewing machines.

In the operation of lasting, the upper of the shoe is drawn tightly about the last and over the bottom thereof, and secured by lasting tacks, and in order that the proper shape may be imparted to the upper by the lasting operation, a great number of lasting tacks are employed which are driven closely together through the edge of the upper and into the bottom of the last, so as to maintain the edge of the upper in position, such lasting tacks being driven quite tightly through the sole into the last. Before the shoe can be sewed it is necessary to remove the lasting tacks, and this is usually done after the shoe has remained on the last a sufficient length of time to cause the upper to become set to the shape of the last, and after the lasting tacks are removed it is necessary to insert a few tacks to hold the upper in position on the last while the sewing progresses. The tacks which are driven, as described, to hold the upper on the last, are usually inserted so that their heads project some distance from the stock to facilitate their easy removal after the shoe has been sewed. It is also the practice before presenting the shoe to the sewing machine to dampen or moisten the channel of the sole in order to "temper" it to facilitate the passage of the needle and awl through the "between substance." This work of removing the lasting tacks, inserting the holding tacks and moistening the channel of the sole has heretofore been performed as three separate operations. Several machines have been devised for removing the lasting tacks automatically but these machines have proved unsatisfactory for various reasons and none of them has had any extensive use so that the operation of removing the lasting tacks as well as the operations of inserting the holding tacks and moistening the channel of the sole are still usually performed by hand. These hand operations on the lasted shoe and especially the operations of removing the lasting tacks and inserting the holding tacks are slow and laborious and therefore objectionable.

The principal object of the present invention is to provide a machine by which the lasting tacks can be removed and the holding tacks inserted at one operation.

Other objects of the invention are to provide a machine by which the lasting tacks can be removed and simultaneously the channel of the sole moistened, to provide a machine by which the three operations of removing the lasting tacks, inserting the holding tacks and moistening the channel of the sole can be performed at the same time, to provide an improved tack pulling mechanism which will operate to remove the lasting tacks from a lasted shoe quickly and in a satisfactory manner without liability of injury to the shoe, to provide a simple and efficient means for moistening the channel of a shoe sole and in general to provide a machine for preparing shoes for sewing, the various parts of which are constructed and arranged in a simple and compact manner and operate with certainty to perform the work for which they are designed.

With these objects in view a feature of the present invention contemplates the provision of tack pulling mechanism and tack driving mchanism constructed and arranged to remove the lasting tacks and to drive holding tacks to secure the released upper in position on the last, whereby both of these operations can be performed rapidly and practically simultaneously and a separate handling of the shoe for each operation is rendered unnecessary. Broadly considered this feature of the invention may be embodied in a machine provided with any suitable mechanism for removing the lasting tacks and for driving holding tacks. A comparatively few holding tacks are required however and consequently the tack driving mechanism is preferably arranged to drive a less number of holding tacks than the number of lasting tacks removed by the pulling mechanism. To produce this result the tack pulling and tack driving mechanism may be arranged and operated in any desired manner. In the preferred form of the present invention this result is secured by a construction and arrangement which permits a plurality of operations of the tack pulling mechanism for a single operation of the tack driving mechanism the specific embodiment of this feature of the invention comprising tack pulling mechanism which runs constantly and tack driving mechanism which is under the control of the operator whereby the holding tacks can be inserted at the points where the operator thinks it necessary or desirable.

Another feature of the present invention contemplates the provision of a moistening device located adjacent to the tack pulling mechanism and adapted to temper the between substance of the sole during the tack pulling operation. While this feature of the invention is particularly applicable to a machine which is also provided with mechanism for driving holding tacks and is preferably embodied in such a machine as thereby all the operations necessary to prepare the shoe for sewing can be performed at the same time, in its broader aspects it is not limited thereto but may be embodied in any machine provided with mechanism for removing the lasting tacks.

The machine hereinafter specifically described as embodying the preferred form of the present invention comprises a work support, and a tack pulling mechanism, a tack driving mechanism and a moistening device all arranged to act upon a lasted shoe while in position against the work support. The work support bears upon the upper outside of the line of lasting tacks and in order to prevent the upper from being displaced when a lasting tack is removed, a downhold is provided which bears against the upper inside of the line of tacks. The provision of this downhold in a tack pulling mechanism constitutes a novel feature of the present invention. The provision of any suitable means for engaging the upper on both sides of the line of tacks in a tack pulling mechanism also constitutes a novel feature of the present invention which is not limited to a construction in which these means consist of a work support and a downhold. Other novel features of the tack pulling mechanism consist in providing the work support with a concave upper surface in order to allow the tack pulling tool or tools to be so actuated as to engage and remove the tacks with certainty, in providing a flexible carrier for the tack pulling tools and mechanism for actuating the tools and carrier, and in providing means for engaging the tacks removed by the tack pulling tool or tools and for discharging them into a receptacle.

The moistening device is arranged to be put in operation by the act of placing the shoe in position in the machine and its principal feature of novelty consists of a movable delivery pipe the lower end of which is normally below the downhold and suitable means actuated by the upward movement of the pipe when the shoe is pressed up against the downhold for permitting a flow of water through the pipe.

In addition to the features of invention above referred to the present invention also consists in certain devices, combinations and arrangements of parts hereinafter described and claimed the advantages of which will be apparent to those skilled in the art from the following description.

The present invention is illustrated in the accompanying drawings, in which

Figure 2:
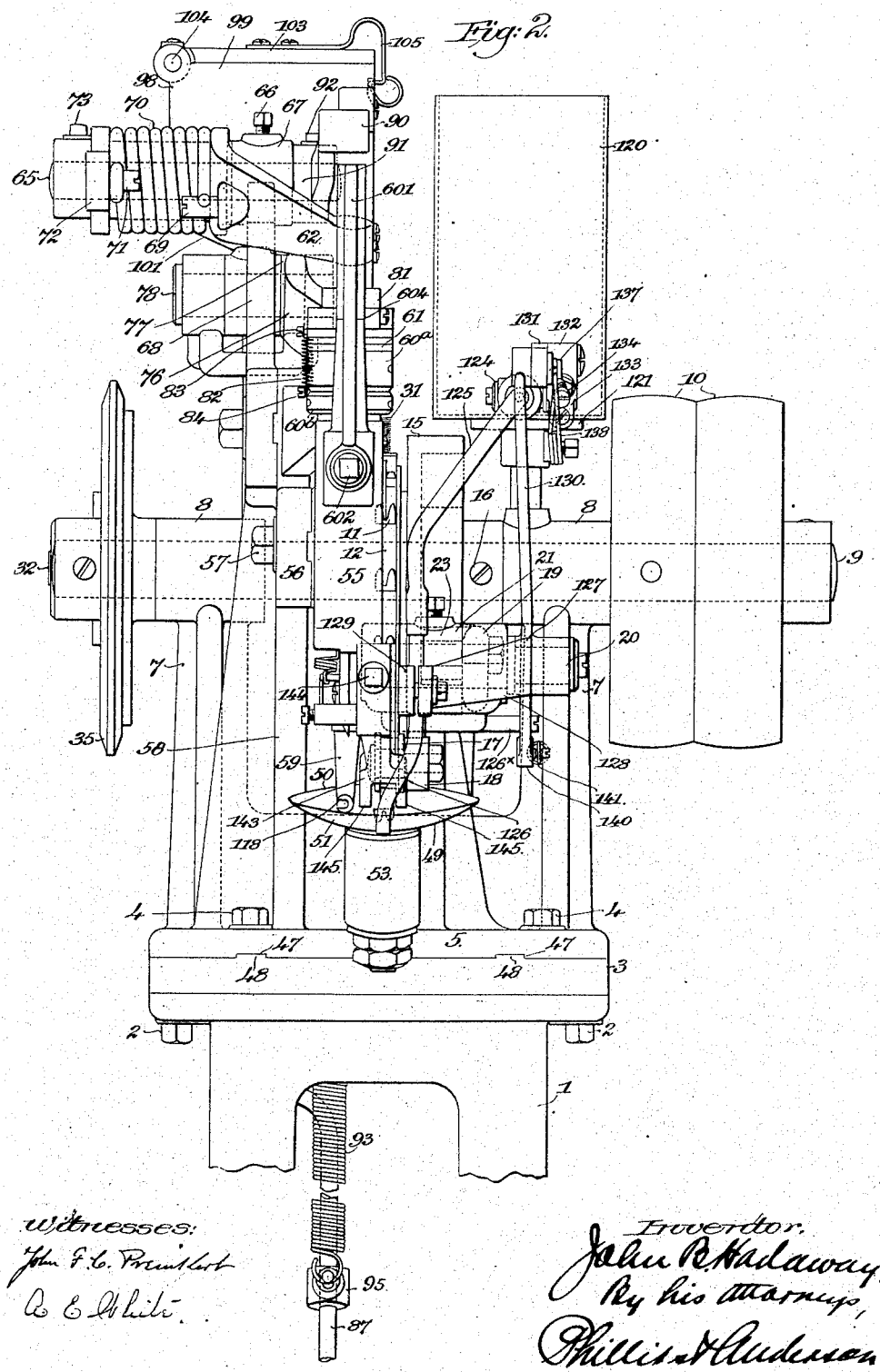
Figure 3:
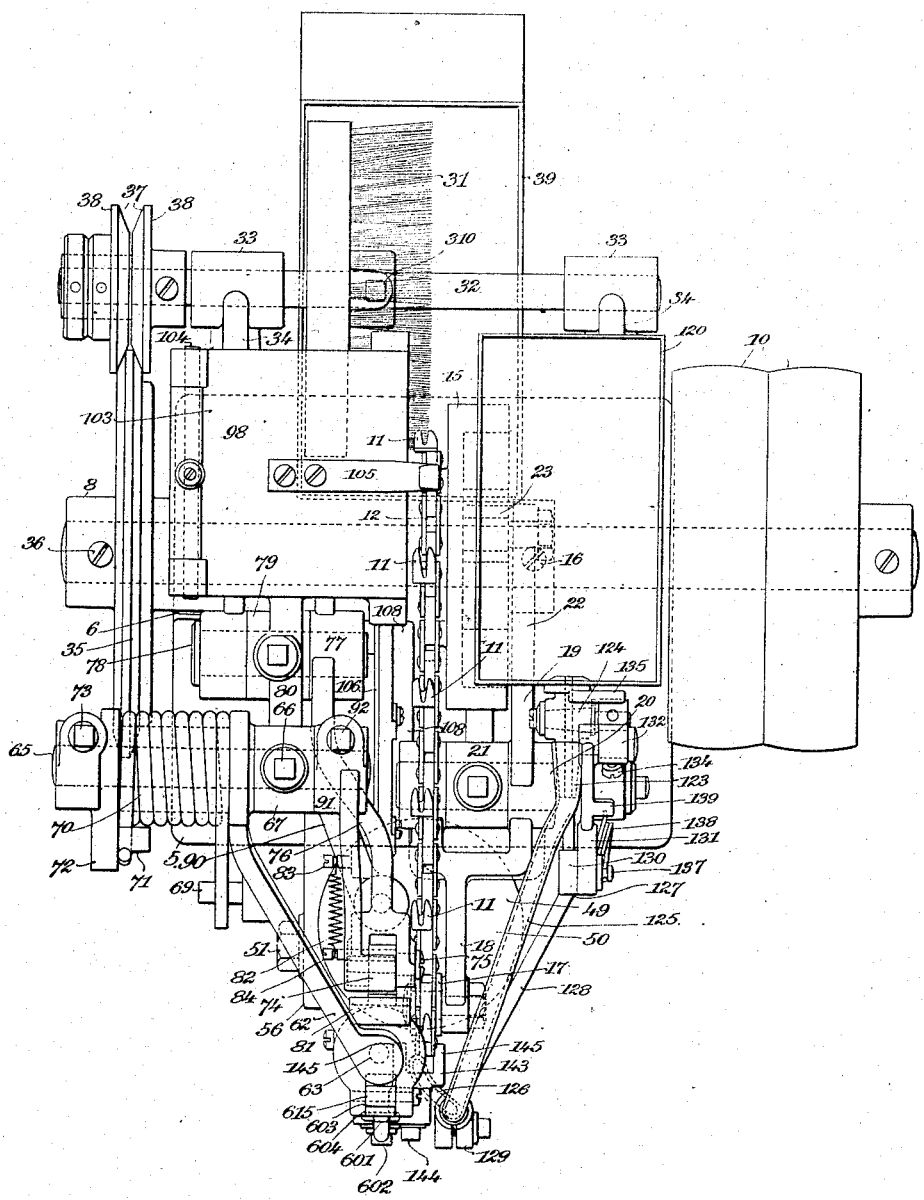

Figure 1 shows in broken side elevation the head of a machine embodying the invention with the driving pulley omitted. Fig. 2 shows a front elevation of the head of the machine, Fig. 3 shows a top plan view. Fig. 4 shows the cam and sprocket wheel which actuate the tack pulling mechanism. Fig. 5 is a vertical section taken on line $x-x$ Fig. 4. Fig. 6 shows the work gage or support removed. Figs. 7, 8, 9 and 10 represent different views of one of the tack pulling claws. Figs. 11 and 12 are, respectively, side and front elevations of the nozzle of the tack driving mechanism. Fig. 13 shows a portion of the upper end of the raceway and the tack feeding mechanism. Fig. 14 is a front view of the tack lifting blade, and Fig. 15 shows in enlarged view portions of the machine with a fragment of a shoe in section, showing the position of the shoe when presented to the machine.

Similar reference characters will be employed throughout the specification and drawings to designate corresponding parts of the machine.

In the drawings 1 represents the supporting base or column which may be of any desired height to rest upon a work bench or the floor to support the head of the machine at a convenient height for the operator. Secured to the top of the column 1 by bolts 2 is a top plate 3 upon which are bolted by means of bolts 4 vertically extending frame sections comprising a front section 5 and a rear section 6. The rear section 6 is provided with vertical standards 7 which carry at their upper ends suitable bearings 8 in which is mounted to turn the driving shaft 9 carrying suitable pulleys 10 arranged to be driven by a belt from any suitable source of power to communicate rotary motion to the shaft 9 to operate the tack pulling mechanism, as will be hereinafter fully set forth.

The tack pulling mechanism of the machine of the drawings comprises a plurality of tack pulling devices, shown as claws 11, fixedly secured to a flexible carrier which may be as shown in the drawings a sprocket chain 12. The sprocket chain 12 is driven from a sprocket wheel 13 supported on and driven by the shaft 9, as by attaching said sprocket wheel by means of bolts 14, to the cam 15, said cam being fastened to the shaft 9 by means of a set screw 16 passing through the hub of said cam and engaging the shaft. It is designed to impart an upward movement to each tack pulling claw as the same is advanced to engage a tack and for this purpose the sprocket chain 12 passes around a pulley or other supporting wheel 17 carried by the forward arm 18 of a lever 19 fulcrumed on a stud 20, supported in a vertical upright 21 of the frame section 5, the rearward arm 22 of the lever 19 carrying a cam roll 23 which engages the cam path of the cam 15.

The above arrangement is such that a rotation of the shaft 9 will impart a rotary movement to the cam 15 and sprocket wheel 13, driving the chain 12 so as to advance the tack pulling claws 11 in a path somewhat inclined to the surface of the work which is held by the operator as will be hereinafter described, the claws being gradually angularly displaced as they are thrust in engagement with the tacks by the passage of the chain around the wheel 17, and the cam 15 acting through the cam roll 23 rocks the lever 19 about its fulcrum 20 to impart an upward movement to the forward arm 18 of such lever as each of the tack pulling claws firmly engages a tack in the work, whereby such tacks will be withdrawn by the tack pulling claws and carried back and delivered to a tack discharging mechanism which will be described.

The shape of the cam 15 or the number of its "throws" will be determined by the distance between the tack pulling devices and the speed of rotation of the cam, and as before stated it is designed that the cam shall rock the lever 19 to raise the roll 17 as each tack pulling device is advanced to a position to engage a tack.

In the machine of the drawing the cam 15 has five throws timed and arranged to secure the lifting of each tack pulling claw in the manner and time stated. For the purpose of accurately adjusting the actuation of the lever 19 in time relation to the advancement of the tack pulling claws the sprocket wheel 13 is adjustably connected to the cam 15 by providing the sprocket wheel with slots 24 through which the attaching bolts pass, so that the sprocket wheel may be turned and adjusted with relation to the cam 15 and thus accurately adjust the relative advancement and upward movement of the tack pulling claws.

The tack pulling claws 11 are shown in detail in Figs. 7, 8, 9 and 10 of the drawing, and as illustrated therein, each of the claws is connected to or formed integrally with a base or support 25 provided with bearings 26, thus forming a link of the sprocket chain 12, the said claw being wider than the base and extending beyond one side thereof as shown in Fig. 10, and is bifurcated as at 27 and undercut as at 28, and connected at one end to the base 25 by means of a narrow neck or shank 29, said shank being cut away upon one side as shown at 30 for a purpose to be hereinafter described. After a tack pulling claw has pulled out a tack from the boot or shoe, such tack will be held by the claw during its return movement, and in the machine of the drawing, I have provided means for removing or ejecting the tack from each claw as it passes around the sprocket wheel 13 and causing it to drop into a chute or hopper which conveys the tacks from the machine and discharges them into a suitable receptacle placed to receive them.

The means for removing or ejecting the tacks from the tack pulling claws in the machine of the drawing consists of a circular brush 31 fixedly secured by means of a set screw 310 to a shaft 32 mounted to turn in bearings 33 supported by horizontally disposed arms 34 projected from the rear of the standards 7, and this brush is rotated preferably in a direction opposite to the direction of rotation of the sprocket wheel 13, whereby the brush will travel in the same direction as the direction of travel of the tack pulling claws as they pass around the rear of the sprocket wheel 13, and such brush is preferably driven at a greater rate of speed than the tack pulling claws are traveling, it being so positioned with reference to the chain 12 and tack pulling claws 11, as shown in Figs. 1 and 3 of the drawing, as to rapidly brush past the tack pulling claws and through the openings or recesses 30 in the shanks of such claws and thereby engage both the heads and shanks of the tacks which may be in said claws ejecting the tacks from the claws and discharging said tacks into the discharging hopper which will be hereinafter described. This operation of the brush 31 may be conveniently secured as in the machine of the drawings, by means of a friction wheel 35, having a substantially V-shaped periphery, fixedly secured by means of a set screw 36 to the driving shaft 9. The V-shaped periphery of the wheel 35 engages a V-shaped recess 37 formed by the inclined meeting faces of the disks or collars 38 adjustably secured on the shaft 32, the arrangement being such that the frictional engagement of the V-shaped periphery of the wheel 35 with the V-shaped recess 37 formed between the collars 38 will impart a rapid rotation to the shaft 32 and the brush 31 in a direction opposite to that in which the sprocket wheel 13 is traveling.

The ejecting device above described for engaging the tacks and removing them from the tack pulling claws I believe to be broadly new and to be the first device ever applied to a tack pulling machine for insuring the removal of the pulled tacks from the tack pulling tool or tools. I am aware that tack pulling machines have been devised provided with a clamping jaw for holding a tack in the tack pulling tool as it moves away from the shoe, which jaw is actuated to allow the tack to drop from the tool by gravity before the tool is again moved towards the shoe. This clamping jaw in no way acts to remove the tack from the tool and is in no sense of the word an ejecting device, the tack remaining in the tool in case the force of gravity is not sufficient to dislodge it. I accordingly consider that the provision in a tack pulling mechanism for pulling lasting tacks from a shoe, of an ejecting device arranged to engage a tack and remove it from the tack pulling device constitutes a feature of the present invention which, broadly considered, is not limited to any particular form of ejecting device and which may be applied to any suitable form of tack pulling mechanism.

The brush 31 sweeps the tacks from the tack pulling claws 11 into the tack discharging hopper 39 formed of any suitable material, and supported beneath the brush and having its forward end slotted so as to embrace a portion of the chain, can, and sprocket wheel (see Fig. 1). The hopper 39 is supported upon a bracket 40 secured by means of a bolt 41 to a block 42, forming part of the frame section 6 as shown in Fig. 1 of the drawing, and it is preferably formed with an inclined bottom 43 and a spout 44, through which the tacks are discharged into a suitable receptacle placed to receive them.

In order to provide for the taking up of any wear in the sprocket wheel or chain, the frame section 6 is arranged to be adjusted along the upper surface of the plate 3, and such adjustment may be conveniently secured by a screw 45 supported to turn in an arm 46 on the bracket 40 and engaging a threaded aperture in the plate 3, said screw being provided with a suitably formed head by means of which it may be turned and thereby move the frame section 6 along the plate 3, the adjustment secured being maintained by tightening up the securing bolts which hold such frame section on the plate 3.

It will be noted that each of the frame sections 5 and 6 is provided upon its under surface with grooves 47 arranged to engage longitudinal ribs 48 on the plate 3, whereby the frame sections are adapted to be accurately positioned upon the supporting plate and prevented from any lateral displacement thereon.

The machine comprises a combined work rest and gage 49 which is preferably formed in the shape of a disk having a concave upper surface 50 and a rounded under surface 51, and such gage is mounted to turn freely upon a post or stud 52 supported in an inclined position in a bearing 53 carried by an arm 54 projected from the standard 21 of the frame section 5. The shoe is held against the gage 49 as shown in Fig. 15 with the line of lasting tacks engaging the periphery of such gage and by concaving the upper surface of this combined work rest and gage, the tack pulling claws are permitted to have a free movement around the pulley 17 and to advance towards and engage the tacks in the manner hereinbefore described, the gage turning freely about its post as the shoe is moved along by the operator.

By concaving the upper surface of the work rest and gage the tack pulling claws may advance towards the line of lasting tacks which are held against its edge, in a path inclined to the surface of the bottom of the shoe, thus insuring the insertion of such claws, beneath the heads of the tacks, and permitting the subsequent angular displacement of such claws, as such claws are further forced beneath the heads of the tacks.

I consider it to be broadly new to combine with a tack pulling device which is advanced towards the tack in an inclined position and which is angularly displaced as it engages the tack, a work rest and gage against which the tacks to be pulled out are held, constructed and arranged to permit such operation of the tack pulling device and that the present invention is not limited to the specific arrangement shown and described.

The operation of the tack pulling mechanism just described is such that as the operator holds the shoe in engagement with the periphery of the gage and moves the same along, the traveling tack pulling claws will engage the lasting tacks and withdraw them from the shoe and deliver them into the tack discharging chute to be discharged from the machine.

As has been heretofore stated, after the removal of the lasting tacks, it is necessary to insert a few tacks, generally five or six, in the lasted shoe for the purpose of holding the upper in position thereon during the sewing operation, such holding tacks being placed at points deemed necessary by the operator. There is combined in the present machine a tack driving mechanism arranged to be under the control of the operator whereby as the lasting tacks are removed, he may insert at various points desired around the bottom of the lasted shoe, any desired number of holding tacks.

The tack driving mechanism of the machine of the drawing consists of a cylinder 55 supported upon an arm 56 by means of a bolt 57, the arm 56 being supported by a vertically extending standard 58 of the frame section 5. The cylinder carries at its lower end a nozzle 59 through which the tacks are driven into the work, which nozzle will be hereinafter described. Arranged to reciprocate vertically in the cylinder 55 is a suitable plunger (not shown) which carries at its lower end any suitable tack driving and cut-off actuating devices for driving the tacks out of the nozzle 59 and controlling the feed of the tacks to said nozzle. Such instrumentalities may be of any of the well known forms, and in and of themselves form no part of the present invention, and therefore while a portion of the cut-off gate and its actuating mechanism is shown in Fig. 2 of the drawing, such mechanism will not be described as its construction and operation are well known. Secured to the plunger is a head 60 which as in devices of a similar character is arranged to rest upon washers 61, supported by adjusting nuts 60ª, 60ᵇ threaded in the upper end of the cylinder 55, whereby the downward movement of the plunger and tack driver may be regulated and the distance the tacks are driven into the work controlled to leave more or less of the tack projected above the surface of the work. The plunger is forced down to cause the driver to drive a tack out of the nozzle 59 and into the work by means of an arm 62, which engages a pin 63 supported in a recess 64 in the head 60 of the plunger. The arm 62 is mounted to turn about a shaft 65 fixedly secured by means of a set screw 66 in a bearing 67 formed in an upwardly extending portion 68 of the standard 58, said arm 62 having a laterally projecting pin 69 which is engaged by one end of a strong coiled spring 70, the opposite end of said spring being secured by means of a stud 71 to a collar 72 secured by means of a bolt or screw 73 to the shaft 65, the arrangement being such that the spring 70 tends to throw down the arm 62 and through the pin 63 the tack driver plunger, thus causing the tack driver to drive the tack out of the nozzle 59 into the shoe supported beneath the same. The tack driver plunger is lifted against the force exerted by the spring 70 by means of a pivoted dog 74, supported upon a screw 75 carried by the forward end 76 of a lever 77 mounted upon a stud 78 arranged to turn in a bearing 79 carried by a rearwardly projecting arm 80 on the vertical extension 68 of the standard 58. The dog 74 is rocked about its fulcrum in order to engage beneath a lug 81 carried by the head 60 of the tack driver plunger by means of a coiled spring 82 which is connected at one end to a stud 83 carried by the arm 76 of the lever 77, and at its opposite end to a pin 84 carried by the lower end of the dog 74, the arrangement being such that as the arm 76 is depressed the dog 74 will engage beneath the lug 81 on the head of the plunger, as shown clearly in Fig. 1 of the drawing. The lever 77 is provided with a rearwardly extending arm 85 to which is pivotally connected at 86 a rod 87, the lower end of which is connected to a suitable foot treadle (not shown) and by means of said foot treadle and rod 87, the lever 77 is rocked about its fulcrum, thus causing the dog 74 to raise the tack driver plunger against the tension of the spring 70, and in order to trip the dog after it has raised the tack driver plunger a sufficient distance, to release said plunger and permit it to be thrown down by the spring 70, I have provided the dog 74 with an upwardly projecting beveled end 88 which is arranged to contact with a beveled shoulder 89 carried at the forward end of an arm 90, the rear end of which is formed with a split bearing 91 and secured by means of a bolt 92 to the inner end of the shaft 65.

In order to guide and support the tack driver plunger in its reciprocations there is provided a vertically extending arm 601 which is fastened by means of a bolt 602 to the front of the cylinder 55 and extends some distance above the top of such cylinder and the arm 601 is provided with a vertical guiding face 603 which fits a notch or recess 604 in the head 60, and against which a roll 615 carried by such head bears, whereby the plunger will be guided and prevented from turning and also supported against any strain which might be imparted by its lifting mechanism.

The above arrangement is such that as the lever 77 is rocked about its fulcrum by the depression of the foot treadle and the downward movement of the rod 87, the dog 74 engaging the lug 81 lifts the tack driver plunger against the tension of the spring 70, and as the beveled end 88 of the dog 74 engages the beveled face 89 of the arm 90 the dog 74 will be rocked about its pivot 75 and withdrawn from beneath the lug 81, permitting the spring 70 through the arm 62 and pin 63 to quickly throw down the tack driver plunger to cause the tack driver carried thereby to drive the tack out of the nozzle 59 into the work. The lever 77 is rocked in the opposite direction to depress the arm 76 to cause the dog 74 to again engage the lug 81 by means of a coiled spring 93, one end of which is secured to a hook 94 or other suitable device on the fixed frame of the machine and the other end to an adjustable collar 95, carried by the rod 87.

The tacks are supplied to the nail driver from a hopper 98 which may be of any usual and convenient construction but which in the machine of the drawing preferably has a part formed or cast with three of its sides integral with the supporting standard 58 and 68 on the end of the rearwardly extending arm 80, this portion of the hopper comprising a side section 99 and two end sections 100, and a bottom preferably inclined as shown at 101, the end sections 100 being provided with projecting lugs 102 having screw-threaded apertures to receive the bolts or screws by which the opposite side section of the hopper is secured in place. The hopper is provided with a cover 103 hinged at 104 to the side section 99 and provided with a spring latch 105 by means of which the hopper may be closed to prevent the tacks from being accidentally discharged therefrom. The hopper communicates with the tack driver by means of an inclined raceway 106 which may be of any usual and preferred construction, provided with a channel 107 down which the tacks are guided with their heads supported on the upper edge of the raceway and said raceway is preferably provided with a guard plate 108 secured to overlap the upper edge thereof, all as is usual in devices of this character.

As hereinbefore stated the bottom 101 of the hopper is inclined, such inclination extending from the line 109 to the base of the hopper 110, and in order to lift the tacks and place them in position to slide down the raceway, there is provided a tack lifting blade 111 provided with a slot 112 and this blade is arranged to oscillate through a bearing or slot 113, formed in the base of the hopper, such blade being provided on opposite ends with curved faces 114 and 115, the face 114 resting against and being uided by a projection 115× located in the hopper and having a face correspondingly curved and the face 115 being against and moving in close contact with the curved end 116 of the raceway 106, which curved end extends into the hopper as shown in Fig. 13 of the drawing. The curves of the faces 115 and 116 are struck from the center of motion of the lever 77, the arm 85 of which carries the blade 111, it being secured to said arm in any suitable or convenient manner, as by means of the screws 117.

The above arrangement is such that the downward movement of the arm 85 of the lever 77 will cause the blade to move downward in the hopper until its upper edge is flush with the base line 110 of the hopper, and as it moves down the tacks fall down the inclined bottom 101 of the hopper covering the upper edge of the blade 111. As the blade rises through the mass of tacks in the hopper, some of them will fall into the slot 112 in such blade, and as the blade reaches the position shown in Fig. 13 with its upper edge inclined and in substantial alinement with the upper edge of the raceway the tacks which have been raised by said blade will be discharged therefrom and slide down the raceway to be picked off and driven by the tack driver as hereinbefore described. In this connection it will be noted that by forming the upper end of the raceway and the adjacent end of the blade on curved lines concentric with the axis of motion of such blade, and by forming the curved meeting ends of the projection 115× and the rear face 114 of the blade on a parallel line, there will be a constant contact of the blade with the guide 115× and the end of the raceway during its movement, so that there is no possibility of the tacks becoming wedged between the ends of the blade and the fixed portion of the hopper and raceway, and the blade will be accurately guided in its movements. It will be further noted that by locating the blade on one end of the lever which carries the pivoted dog which raises the tack driver plunger, said blade will be depressed on the upward movement of the dog in lifting the driver plunger, and as such dog is depressed to again engage the driver plunger the blade will be raised, thus securing by a single lever the operation of the driver and tack lifting blade, greatly simplifying the construction of the tack driving and tack feeding mechanism.

In order to limit the extent of rocking movement of the lever 77 in one direction to prevent undue movement of such parts tending to injure or displace them, there is provided on the rod 87 a stop collar 96 which, when said rod is drawn down, engages the frame of the machine and thus limits the downward movement of the blade 111 and the upward movement of the dog 74.

An adjustable stop 64× shown as a threaded bolt which is tapped into a threaded bearing 65× in a forwardly projecting arm 66× of the vertical extension 68 of the frame in position to engage the arm 76 of the lever 77 to limit its downward movement, insures the correct positioning of the pivotal dog 74 to engage the lug 81 and also limits the upward movement of the blade 111, so that its upper edge will be substantially in alinement with the upper edge of the raceway.

As hereinbefore stated the shoe is held against the work rest and gage 50 with the periphery of such gage in contact with the row of lasting tacks, and the bottom of the shoe somewhat inclined as shown in Fig. 15. In order to permit this inclination of the shoe, the end of the tack driving nozzle 59 is inclined or beveled as shown at 118, and inasmuch as it is desirable that the heads of the holding tacks be left projecting some distance beyond the work for the convenience of their subsequent removal, one side of the nozzle 59 is cut out or provided with a notch 119, preferably arranged on the left-hand side of such nozzle as the feed of the work in the machine of the drawing will be from right to left, thus the heads of the holding tacks may pass freely through the notch 119 as the shoe is moved along. As viewed in Fig. 2 the tack driving nozzle is located at the left side of the tack pulling claws or at the rear of the claws, in the direction in which the shoe is fed, so that the tacks driven by the tack driving mechanism are not removed by the tack pulling mechanism.

As hereinbefore stated the present machine comprises mechanism for moistening or "tempering" the channel of the sole or the "between substance," as the shoe is passed along beneath the tack pulling and tack driving instrumentalities, and this moistening mechanism of the machine illustrated in the drawings consists of a tank 120 which may be, as shown, substantially rectangular in shape and open at the top for the reception of water or other suitable moistening liquid. The tank is supported upon a plate 121 mounted upon a post 122 rising from the upper end of the standard 7, above the bearing 8 thereof. Communicating with the tank 120 is a discharge nozzle 123 which is provided with a suitable cock or valve 124 by means of which the flow of water from the tank 120 may be controlled, and this nozzle 123 connects by means of a flexible pipe 125 of rubber or other suitable material, with a short metallic pipe 126 which is bent inwardly at its lower open end in a position to discharge water into the channel of the sole. I have provided in the machine of the drawings automatic means for operating the valve or cock 124 so that when the shoe is presented in proper position to be operated upon by the tack pulling and driving devices, the valve will be automatically opened, permitting the water to flow through the pipes 125 and 126 from such tank to moisten the sole, and whereby when the shoe is removed from the machine the valve will be automatically closed to shut off the flow of water from the tank 120. The means for controlling the valve 124 consists of a three-armed lever 127 fulcrumed upon the stud 20, which supports the lever 19, one arm 128 of the lever carrying the pipe 126 which is secured therein by means of a clamp bearing 129, whereby as the shoe is moved up in contact with the lower end of the pipe 126, it will raise such pipe and therefore the arm 128 of the lever 127, and rock said lever about its fulcrum 20. The arm 130 of the lever 127 is connected by means of a link 131 to an arm 132, secured by means of a clamp bearing 133 to the end of the cock or valve 124, whereby as the lever 127 is rocked about its fulcrum 20, it will, by means of its arm 130, link 131 and arm 132, turn the cock or valve in the nozzle 123 and permit water to flow from the tank 120.

I have provided an adjusting screw 134 tapped into the arm 132 and arranged to engage a lug 135 whereby to limit and adjust the turning of the cock or valve to regulate the amount of water permitted to flow from the tank when the valve shall be opened, and in order to provide for the continued upward movement of the pipe 126 in order to properly position the shoe with relation to the other instrumentalities of the machine after the adjusting screw 134 shall have engaged the lug 135, the arm 130 of the lever 127 is connected with the link 131 so that a certain amount of lost motion is secured between such arm and link 131, which result is obtained by forming the link 131 with a slot through which a bolt or screw 137 carried by the arm 130 of the lever 127 passes, and the thrust of the arm 130 is communicated to the link 131 by means of a spring 138, one arm of which engages a lug 139 carried by the link 131. In order to rock the lever 127 in the opposite direction to depress the pipe 126 and through the link 131 and arm 132 close the valve I have provided such lever with a depending arm 140 below its fulcrum which is engaged by one end of a coiled spring 141, the opposite end of such spring being connected at 142 to a fixed part of the machine preferably the standard 7.

The downward movement of the lever 127 and the pipe 126 is limited by a stop 126* secured to the standard 21 of the frame section 5 and arranged to engage the arm 140 of the lever 127.

In order to limit the upward movement of the shoe and to position the same in proper relation to the tack pulling and driving devices, I have provided a downhold or gage 143 which is secured by means of screw 144 to the front of the cylinder or casing of the tack driving device, and which, as shown in Figs. 1 and 2, extends downward and is inclined inward towards the work rest and gage 49 (see Fig. 1), the lower end being preferably forked or provided with two engaging feet 145, which engage the work upon opposite sides of the point at which the tack pulling claws engage the tacks which are to be withdrawn from the work, thus affording a fixed bearing point upon opposite sides of the tack which is being pulled out of the work and preventing the pull exerted from displacing the work.

If deemed desirable and in order to assist the work rest and gage 49 in maintaining the upper of the shoe in position after the lasting tacks along that portion being operated upon have been withdrawn, and while the work is being moved along, pending the insertion of a holding tack, the rounded under face 51 of said gage may be provided near its periphery with a serrated or milled surface 146 (see Fig. 6 of the drawing), which will frictionally engage the upper and hold it in position while a holding tack is being inserted.

It will be noted that the relative arrangement of the downhold 143 and work rest and gage 49 and the inclined or beveled end of the tack driving nozzle 59 enables the accurate positioning of the work with relation to the tack pulling, tack driving and moistening devices, and that there is absolutely no possibility of the upper of the shoe being gouged or damaged by the tack pulling devices.

In the operation of the machine of the drawings, the lasted shoe is held by the operator and presented to the machine with the lasting tacks bearing against the periphery of the work gage or support, and the under surface thereof engaging the upper, the shoe being slightly inclined, so that the contact of the shoe sole with the pipe 126 of the moistening mechanism will act to raise said pipe, such upward movement bringing the sole of the shoe in contact with the nozzle of the tack driving mechanism and against the downhold or gage. The upward movement of the pipe 126 operates to rock the lever 127 and opens the valve of the moistening mechanism, permitting the water to flow through the pipe and into the channel of the sole as the shoe is moved along to wet or "temper" the between substance.

Motion being imparted to the shaft 9, the tack pulling claws will be rapidly advanced toward the line of lasting tacks and each claw will draw from the shoe a tack as it moves around the supporting wheel 17, such pulling movement taking place in the manner before described. As the operator moves the shoe along, he will by the foot treadle and the rod 87 actuate the tack driving mechanism to insert holding tacks at any points along the shoe which may be desired.

Having thus described the construction and mode of operation of my invention, I claim as new and desire to secure by Letters Patent of the United States:—

1. In a machine for preparing shoes for sewing, the combination with constantly running tack pulling mechanism, of tack driving mechanism, and means under the control of the operator for actuating the tack driving mechanism, substantially as described.

2. In a machine for preparing shoes for sewing, the combination with constantly running tack pulling mechanism and a tack driving mechanism controlled by the operator, of a moistening device for tempering the between substance of the sole during the operation of the tack pulling and tack driving mechanisms, substantially as described, 3. In a machine for preparing shoes for sewing, the combination with a tack pulling tool and means to actuate the same, of a brush and means to actuate said brush to remove the tack from said tool, substantially as described.

4. In a machine for preparing shoes for sewing, the combination with a flexible carrier, of a series of tack pulling tools carried by said carrier, and means to actuate the carrier substantially as described.

5. In a machine for preparing shoes for sewing, the combination with a chain, of a series of tack pulling tools carried by said chain, and suitable sprocket mechanism to actuate the chain, substantially as described.

6. In a machine for preparing shoes for sewing, the combination with a chain, of a series of tack pulling tools formed integrally with a series of the links of the chain, substantially as described.

7. In a machine for preparing shoes for sewing, the combination with a rest or gage against which the shoe is supported, of a continuously traveling flexible carrier, a tack pulling tool carried thereby and means to raise the tool as it passes the front of the rest or gage, substantially as described.

8. In a machine for preparing shoes for sewing, the combination with a flexible carrier, of a tack pulling tool carried thereby, means for actuating said carrier, a wheel over which said carrier runs, and means for raising the wheel as the tack pulling tool is about to pass around the wheel, substantially as described.

9. In a machine for preparing shoes for sewing, the combination with a flexible carrier, of a series of tack pulling tools carried thereby, means for driving said carrier, a wheel around which the carrier is driven and means for raising the wheel in time relation to the passage of each tack pulling tool around the wheel, substantially as described.

10. In a machine for preparing shoes for sewing, the combination with a flexible carrier, of a series of tack pulling tools carried thereby, a supporting wheel, a lever carrying said wheel and means to rock the lever to raise the wheel as the tack pulling tools pass around the wheel, substantially as described.

11. In a machine for preparing shoes for sewing, the combination with tack driving mechanism having a spring depressed plunger, of a tack feeding mechanism having a hopper and a tack lifting blade, and a lever for alternately raising the tack driving plunger and the tack lifting blade, substantially as described.

12. In a machine for preparing shoes for sewing, the combination with a downhold against which the sole of the shoe is adapted to be pressed, of a moistening device comprising a tank, a valve for controlling the flow of water therefrom, a pipe connected with the tank having its open end normally below the downhold and adapted to be raised as the shoe is moved up towards the downhold and means actuated by the movement of the pipe for opening and closing the valve, the position of the pipe with relation to the downhold being such that a sufficient movement of the pipe to actuate the valve is produced during the movement of the shoe towards the downhold substantially as described.

13. In a machine for preparing shoes for sewing, the combination with a tank, of a valve for controlling the flow of water therefrom, a stop to limit the extent of opening of said valve a pipe connected with the tank, a movable carrier for said pipe and yielding connections between the carrier and the valve to actuate said valve upon the movement of said carrier, substantially as described.

14. In a machine for preparing shoes for sewing, the combination with tack pulling and tack driving devices, of a suitable work rest or gage provided with a milled or roughened surface to hold the upper during the operation of said devices, substantially as described.

15. In a machine for preparing shoes for sewing, the combination with a work rest or gage having a concave upper surface, of a tack pulling tool mounted to move in the concavity formed by said concave surface, and means to actuate such tool to cause it to advance towards the line of tacks in a path inclined to the surface of the work, and to be angularly displaced as it engages a tack, substantially as described.

16. In a machine for preparing shoes for sewing, the combination with a tack pulling tool, of a work rest or gage having a concave upper surface, and means to actuate said tack pulling tool to cause it to enter such concavity, and to emerge therefrom near the periphery of the gage, substantially as described.

17. In a machine for preparing shoes for sewing, the combination with a tack pulling tool, of a work rest or gage against which the tacks to be pulled out are arranged to be pressed and which bears on the upper of the shoe outside of the line of tacks, and a downhold for engaging the upper of the shoe within and adjacent to the line of tacks and adjacent to the work rest or gage, substantially as described.

18. In a machine for preparing shoes for sewing, the combination with a rotary work rest or gage mounted to turn on an inclined axis and provided with a concave upper surface and a tack pulling tool arranged above the rotary work rest or gage, mounted to move in the concavity formed by said concave surface substantially as described.

19. In a machine for preparing shoes for sewing, the combination with a work rest or gage of a tack pulling tool a downhold inclined towards the work rest or gage and a tack driver nozzle having a beveled end, substantially as described.

20. In a machine for preparing shoes for sewing, the combination with a downhold, against which the shoe is adapted to be pressed of a moistening device having a movable pipe normally maintained with its lower end below the downhold and means actuated by an upward movement of the pipe to permit the flow of liquid through said pipe, the position of the pipe with relation to the downhold being such that a sufficient movement of the pipe to permit the flow of liquid therethrough is produced during the movement of the shoe towards the downhold substantially as described.

21. In a machine for preparing shoes for sewing, the combination with tack-pulling mechanism for pulling the lasting tacks to release the upper, of tack-driving mechanism for driving holding tacks coöperating therewith to secure the upper in position on the last, as it is released by the tack pulling mechanism substantially as described.

22. In a machine for preparing shoes for sewing, the combination with tack-pulling mechanism, of a moistening device constructed to be set in operation by the presentation of the shoe to the tack pulling mechanism for tempering the between substance during the operation of the tack-pulling mechanism, substantially as described.

23. In a machine for preparing shoes for sewing, the combination with a tack pulling mechanism, of a tack driving mechanism located adjacent to the tack pulling mechanism and upon one side thereof in the line of the feed of the work, said tack driving mechanism having a nozzle with a beveled end whereby said nozzle will conform to the inclination of the shoe when said shoe is presented to the action of the tack pulling mechanism, substantially as described.

24. In a machine for preparing shoes for sewing, the combination with a tack pulling tool, of means engaging the upper of the shoe on both sides of the line of tacks to be pulled to hold the upper in place during the operation of the tack pulling tool, substantially as described.

25. In a machine for preparing shoes for sewing, the combination with a tack pulling tool, of a downhold bearing against the edge of the upper inside and adjacent to the line of tacks to be pulled, substantially as described.

26. In a machine for preparing shoes for sewing, the combination with tack pulling mechanism for pulling lasting tacks and tack driving mechanism for driving holding tacks, of means for holding the upper of the shoe in position while the lasting tacks are being pulled and until the holding tacks are driven, substantially as described.

27. In a machine for preparing shoes for sewing, the combination with tack pulling mechanism, of a moistening device located adjacent to the tack pulling mechanism adapted to temper the between substance during the operation of the tack pulling mechanism, substantially as described.

28. In a machine for preparing shoes for sewing, the combination with a work rest or gage against which the work is held during the operation of the machine, of tack pulling mechanism, and a moistening device for tempering the between substance, said tack pulling mechanism and moistening device being arranged to act simultaneously upon a shoe while in position against the work support, substantially as described.

29. In a machine for preparing shoes for sewing, the combination with a work rest or gage against which the work is held during the operation of the machine, of tack pulling mechanism for pulling lasting tacks, and tack driving mechanism for driving holding tacks, both of said mechanisms being arranged to act upon a shoe while in position against the work support, substantially as described.

30. In a machine for preparing shoes for sewing, the combination with a work rest or gage against which the work is held during the operation of the machine, of a moistening device for tempering the between-substance, tack pulling mechanism for pulling lasting tacks, and tack driving mechanism for driving holding tacks, both of said mechanisms and said moistening device being arranged to act upon a shoe while in position against the work support, substantially as described.

31. In a machine for preparing shoes for sewing, the combination of tack pulling mechanism and tack driving mechanism constructed and arranged to remove the lasting tacks and to drive a less number of holding tacks to secure the released upper, substantially as described.

32. In a machine for preparing shoes for sewing, the combination of tack pulling mechanism and tack driving mechanism constructed and arranged to permit a plurality of operations of the tack pulling mechanism for a single operation of the tack driving mechanism, substantially as described.

33. In a machine for preparing shoes for sewing, the combination with tack pulling mechanism for pulling the lasting tacks to release the upper of tack driving mechanism for driving holding tacks arranged to act upon the shoe at the rear of the tack pulling mechanism and secure the released upper in position on the last as it is released by the tack pulling mechanism, substantially as described.

34. In a machine for preparing shoes for sewing, the combination with a tack pulling tool and means to actuate the same to engage a projecting lasting tack and remove the tack from the shoe, of a hopper and an ejecting device arranged to engage the tack while held by the tool and discharge it into the hopper, substantially as described.

35. A machine for preparing shoes for sewing, having, in combination, a tack pulling device and means for actuating the same to engage a projecting lasting tack and remove the tack from the shoe, and an ejecting device acting to engage the tack and remove it from the tack pulling device, substantially as described.

36. A machine for preparing shoes for sewing, having, in combination, a tack pulling device and means for actuating the same to engage a projecting lasting tack and remove the tack from the shoe, and a movable ejecting device and means to actuate it to remove the tack from the tack pulling device, substantially as described.

37. A machine for operating on lasted shoes, comprising means for withdrawing the lasting tacks, and means operating in connection therewith for driving stay tacks intermittingly without interfering with said withdrawal of the lasting tacks.

38. A machine for operating on lasted shoes, comprising the combination with automatic means for withdrawing the lasting tacks, of means for driving stay tacks at will while removing said lasting tacks.

In testimony whereof I affix my signature, in presence of two witnesses.

JOHN B. HADAWAY.

Witnesses:
T. HAAT ANDERSON,
A. E. WHITE.